US008163828B2

(12) United States Patent
Ebbinghaus et al.

(10) Patent No.: US 8,163,828 B2
(45) Date of Patent: Apr. 24, 2012

(54) ADDITIVE FOR POLYMERS AND PROCESS FOR PREPARATION THEREOF

(75) Inventors: Peter Ebbinghaus, Herten (DE); Bernhard Becker, Krefeld (DE); Jens Kohnert, Alpen (DE); Jörg Hocken, Meerbusch (DE); Ralf Schellen, Moers (DE); Bernd-Michael Klein, Duisburg (DE); Friedrich Müller, Duisburg (DE); Sonja Grothe, Oberhausen (DE); Bernd Rohe, Moers (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 12/738,849

(22) PCT Filed: Oct. 20, 2008

(86) PCT No.: PCT/EP2008/008870
§ 371 (c)(1),
(2), (4) Date: Jul. 9, 2010

(87) PCT Pub. No.: WO2009/053018
PCT Pub. Date: Apr. 30, 2009

(65) Prior Publication Data
US 2010/0267878 A1    Oct. 21, 2010

(30) Foreign Application Priority Data
Oct. 22, 2007  (DE) .......................... 10 2007 050 728

(51) Int. Cl.
*C08K 3/30* (2006.01)
(52) U.S. Cl. ........ 524/423; 524/414; 524/430; 524/442; 523/205; 523/206; 423/155; 423/309; 423/331
(58) Field of Classification Search ................. 524/414, 524/423, 430, 442; 523/205, 216; 423/155, 423/309, 331
See application file for complete search history.

(56) References Cited

U.S. PATENT DOCUMENTS
2,263,656 A * 11/1941 Stutz ............................ 106/420

FOREIGN PATENT DOCUMENTS
| DE | A-33 47 191 | 6/1984 |
| DE | A-44 31 375 | 3/1997 |
| GB | 2 134 094 A | 8/1984 |
| GB | 2 174 999 A | 11/1986 |
| WO | WO 2008155050 A | 12/2008 |

OTHER PUBLICATIONS

English Translation of International Preliminary Report on Patentability in PCT App. No. PCT/EP2008/008870.
English Abstract of DE-A-44 31 375, Jul. 3, 1996.
English Abstract of WO 2008155050, Dec. 24, 2008.

* cited by examiner

*Primary Examiner* — Peter Szekely
(74) *Attorney, Agent, or Firm* — Cahn & Samuels, LLP

(57) ABSTRACT

The invention concerns a process for preparing an additive for polymers, the additive itself and the use of the additive for improving the surface properties of polymers.

20 Claims, 1 Drawing Sheet

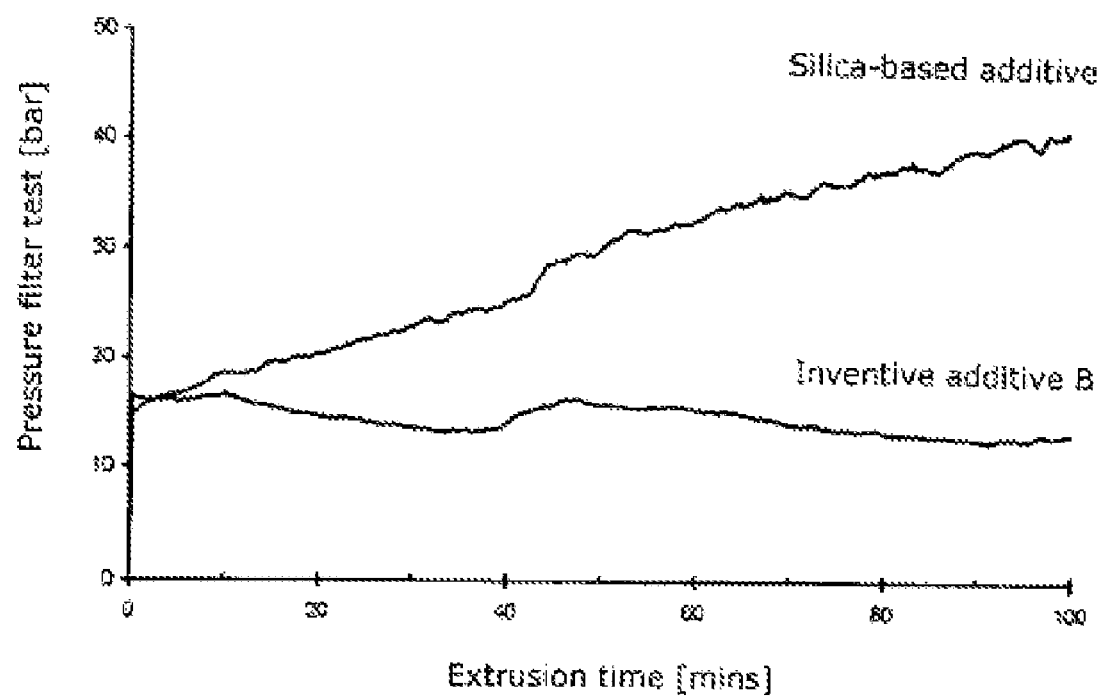

ADDITIVE FOR POLYMERS AND PROCESS FOR PREPARATION THEREOF

This application is a U.S. national stage application of PCT/EP2008/008870 filed on 20 Oct. 2008 and claims priority of German patent document 10-2007-050-728.5 filed on 22 Oct. 2007.

FIELD OF INVENTION

The invention concerns a process for the production of an additive for polymers, the additive itself and the use of the additive for improving the surface properties of polymers, in particular in the form of films, fibres and lacquers.

BACKGROUND OF INVENTION

Polymer films have a tendency to cling to each other so that in further processing film layers can often only be separated from each other with very great difficulty. The underlying mechanisms of that 'blocking' are not completely understood, but inter alia the following aspects of adhesion forces are referred to in the literature:
  process parameters, for example temperature and pressure,
  migration of low-molecular polymer constituents,
  electrostatic and other attractive forces, and
  surface structure.

Minimisation of the necessary force for the separation of film layers is dependent on the above-mentioned aspects and the influence on the reduction in the adhesion forces is defined as 'anti-blocking'.

In the production of polymer films, usually organic or inorganic additives such as fatty acid compounds or inorganic particulate material predominantly silicate-based are used in the state of the art for that purpose, which induce surface roughness and which thus function as a 'spacer' between the film layers, whereby the adhesion forces are minimised. By way of example attention is directed here to G Wypych 'Handbook of Antiblocking, Release, and Slip Additives' (Hanser Verlag—2005) or H Zweifel, 'Plastics Additives Handbook' (Hanser Verlag—2000) as well as WO 96/001289.

On the other hand those organic or inorganic additives, besides that desired effect of the COF reduction (coefficient of friction) at the same time also exert an unwanted adverse influence on the optical properties such as for example gloss, haze, transmittance and processability of the polymer so that it is often necessary to arrive at a compromise between process-engineering and optical demands on the film.

An additive which satisfies those aspects in many respects is however not known in the state of the art and therefore the object of the invention was to provide an additive which can both be well incorporated into the polymer and which also allows the polymer compounded with the additive in that way itself to be well processed and which imparts to the polymer good optical properties with at the same time outstanding 'anti-blocking' properties.

On the part of the inventors it has now surprisingly been found that such an additive can be obtained by means of the process having the features set forth in the main claim.

SUMMARY OF INVENTION

A process for the production of an additive for polymers is characterized in that a. phosphoric acid $H_3PO_4$ or a water-soluble phosphate compound is added in an amount of 0.1 to 10% by weight, calculated as $P_2O_5$ and with respect to dry $BaSO_4$, to an agitated aqueous suspension containing 0.5 to 50% by weight of $BaSO_4$; b. $Na_2SiO_3$ is added in an amount of 0.1 to 15% by weight, calculated as $SiO_2$ and with respect to dry $BaSO_4$, to the agitated suspension in accordance with process step (a), wherein the pH value of the suspension is kept below 7.5; c. a water-soluble aluminium compound is added in an amount of 0.1 to 20% by weight, calculated as $Al_2O_3$ and with respect to $BaSO_4$, to the agitated suspension in accordance with process step (b), wherein the pH value of the suspension is not kept below 4.5; and d. the suspended solid is separated from the aqueous phase of the suspension in accordance with process step (c) and dried. The process steps (a), (b), and (c) are each respectively carried out over a period of 30 to 90 minutes in a temperature range of below 65° C.

BRIEF DESCRIPTION OF THE DRAWING

The sole Figure is a graph of a pressure filter test for a silica-based additive and an additive according to an embodiment of the present invention.

DETAILED DESCRIPTION OF INVENTION

Thus the present invention concerns a process for the production of an additive for polymers, which is characterised in that
  phosphoric acid $H_3PO_4$ or a water-soluble phosphate compound is added in an amount of 0.1 to 10% by weight (calculated as $P_2O_5$ and with respect to dry $BaSO_4$) to an agitated aqueous suspension containing 0.5 to 50% by weight of $BaSO_4$;
  thereafter $Na_2SiO_3$ is added in an amount of 0.1 to 15% by weight (calculated as $SiO_2$ and with respect to dry $BaSO_4$) to the agitated suspension in accordance with process step (a), wherein the pH value of the suspension is kept below 7.5;
  then a water-soluble aluminium compound is added in an amount of 0.1 to 20% by weight (calculated as $Al_2O_3$ and with respect to $BaSO_4$) to the agitated suspension in accordance with process step (b), wherein the pH value of the suspension is not kept below 4.5; and
  finally the suspended solid is separated from the aqueous phase of the suspension in accordance with process step (c) and dried;
wherein the process steps for the addition of the reagents are respectively carried out over a period of 30 to 90 minutes in a temperature range of below 65° C.

Preferably the process steps (a), (b) and (c) are carried out in the temperature range of 55 to below 65° C. Further improved additives are obtained if process steps a., b. and c. are respectively carried out over a period of 50 to 70 minutes.

The inventors have further found that the properties of the product are still further improved if the product is subjected to a further process step for coating with an organic coating agent.

In that respect the organic coating agent is preferably a crosslinking, dispersing or deflocculation agent. That denotes an interface-active substance which facilitates the dispersion of a substance in powder form in a fluid medium by the interfacial tension between two oppositely charged components being reduced by 'charge reversal' of the surface. In that way, in the dispersing operation the existing agglomerates are broken down so that re-agglomeration or flocculation is prevented.

Both ionogenic and also non-ionogenic dispersing agents can be used as the crosslinking, dispersing or deflocculation agent (hereinafter only dispersing agent is referred to). Preferably the following substances can be used: alkali metal salts of organic acids (for example salts of poly(meth)acrylic acid, acetic acid, citric acid), in particular alkali metal, alkaline earth and zinc salts of acetic acid and/or citric acid, alkali metal or alkaline earth metal salts of acrylate or methacrylate copolymers (with a preferred molecular weight of up to 16,000), polyphosphates (inorganic or organic polyphosphates, for example potassium tripolyphosphate, poly(meth)acrylate phosphates), generally poly(meth)acrylates, polyethers, anionically modified polyethers, fatty alcohol polyglycol ethers, polyhydric alcohols, for example trimethylolpropane, modified polyurethanes or anion-active aliphatic esters or mixtures thereof. Alkali metal salts of organic acids, for example salts of poly(meth)acrylic acid and/or polyphosphates, for example potassium tripolyphosphate, are preferred.

The amount of the coating agent added is dependent on the mean particle size of the inorganic solids. The finer the inorganic solid particles are, the correspondingly greater is the added amount of dispersing agent. The added amount of dispersing agent is 20% by weight at a maximum and is preferably 0.01 to 20% by weight, particularly preferably 0.05 to 10% by weight and with respect to the finished coated product.

In that respect the process step for coating with the organic coating agent can preferably be carried out over a period of 5 to 60 minutes, preferably at a temperature of 40 to 80° C.

To improve the aspect of incorporation into the polymer and the optical properties of the polymer such as reduced haze and gloss the product which is separated off from the suspension can be subjected to a crushing step, preferably in an impact or fluid-energy jet mill, in order to separate off grain sizes of more than 15 µm and in particular to obtain a grain size of below 10 µm. It is further preferred for the crushing step to be continued until the grain sizes of the resulting additive particles are in the grain size ranges of 4.5-7.5 µm, 2.5-3.5 µm, 1.2-1.6 µm and 0.2-0.9 µm. Depending on the respective polymer used, in particular in relation to those for stretched films and fibres, the grain sizes can be so selected as to impart the desired optical and anti-blocking properties to the polymer.

It is thus of particular advantage if, by means of the additive particles treated in accordance with the invention, it is possible to produce masterbatches and compounds of thermoplastic materials, in which the additive particles are so excellently dispersed that high-value products can be produced therefrom without involving particular additional complication and expenditure. Besides an extrusion masterbatch, introduction of the additive into the polymer process can also be effected by way of a slurry route.

The invention is therefore also directed to an additive for polymers, which can be obtained in accordance with the process of the invention.

The additive produced in accordance with the invention can be used particularly well for improving the anti-blocking properties in relation to polymer films. In that case the polymer is preferably selected from the group of thermoplastic polymers. They include in particular polyimides, polyamides, polyesters, PVC or polyolefins of olefinic monomers having 2 to 8 C-atoms. The additive is particularly suitable for polymer films of polyester, with PET being particularly preferred. On the basis of the values measured when using the additive produced in accordance with the invention, it is possible to demonstrate a marked improvement in the COF values of the films.

Besides the improvement in the anti-blocking properties the inventors also carried out investigations for improving the optical properties of the polymers and found that the additives produced in accordance with the invention impart to the polymers, in particular in film form, a lesser degree of haze, increased transmittance and also improved gloss. High-gloss films can thus be produced with at the same time a reduced level of haze.

In that respect the content of additive in the polymer is preferably in the range of 200 to 10,000 ppm, particularly preferably in the range of 200 to 5000 ppm, in each case with respect to the finished product.

In a corresponding fashion when using the additive according to the invention for an aforementioned polymer it is also possible to produce so-called 'super bright yarn' fibres which give a high-gloss fabric. Preferably an additive according to the invention with a particle size of 0.2-0.9 µm is suitable for that purpose.

When using an additive according to the invention for the production of PCB inks it is found that lacquer layers with the desired optical properties which are improved in comparison with the additives used at the present time (increased gloss, reduced haze) can be achieved, with simultaneous attainment of the required properties in respect for example of rheology control, chemical resistance and solderability.

In principle the addition of inert particles to a PCB lacquer serves to control the rheological properties of the printing ink in such a way that inter alia layer thickness, edge coverage and solderability can be adjusted in accordance with predetermined tolerances in respect of the conductor tracks.

When using an additive according to the invention for the production of Printed Circuit Board (PCB) inks it is found that lacquer layers with the desired optical properties which are improved in comparison with the additives used at the present time (increased gloss, reduced haze) can be achieved, with simultaneous attainment of the required properties in respect for example of rheology control, chemical resistance and solderability.

The content of additive in the PCB lacquer is in that case preferably in the range of 5.0 to 70.0% by weight and particularly preferably in the range of 15.0 to 50.0% by weight.

The mean particle size of the additive according to the invention, for use in PCB inks, is preferably in the range of 0.05-2.00 µm, particularly preferably 0.2-0.9 µm.

It was further found by the inventors that the additive according to the invention can also be used for improving the processibility of polymer fibres. In the state of the art, in particular poor spinnability aspects (yarn breakages) are known as a disadvantage of bright and superbright fibres and filaments. A known possible way of improving spinnability is the use of small amounts ($\leq$0.05% by weight) of $TiO_2$ particles. The use of $TiO_2$ however also has at the same time an adverse effect on the optical properties such as for example the gloss of the fibres and filaments.

The use of the $BaSO_4$ additive according to the invention provides for an improvement in the spinnability of polymer fibres without in that respect worsening the optical properties such as gloss. The improvement in spinnability shows itself directly in a marked reduction in yarn breakages. In addition the use of the additive according to the invention affords the possibility of increasing the spinning speed.

The optical properties of the polymer fibres are usually visually assessed on woven or knitted materials produced therefrom or are measured by means of current measurement processes (known for example for the assessment of paints and lacquers).

The synthetic fibre generally comprises thermoplastic materials such as for example polyester, polyamide, polyethylene or polypropylene, preferably polyamide or PET. In that respect the content of additive according to the invention in the polymer is preferably in the range of 0.01 to 1.00% by weight, particularly preferably in the range of 0.05 to 0.3% by weight, in each case with respect to the finished product.

The mean particle size of the additive according to the invention, for use in polymer fibres, is preferably in the range of 0.05-2.00 µm, particularly preferably 0.2-0.9 µm.

Preferably the additive according to the invention is already added in the polymer production stage, for example in the polycondensation of PET, in the form of a dispersion in ethylene glycol. Alternatively it is firstly possible to produce a masterbatch by means of melt extrusion, which preferably contains 5-80% by weight of barium sulphate produced in accordance with the invention. That masterbatch can then be diluted with the raw polymer and possibly dispersed once again.

The filaments are produced using the polymer with additive or a masterbatch, with the addition of pure PET, as follows. The melting operation is generally effected in an extruder which services a spinning installation with a plurality of spinning positions. After the threads issue from the spinning nozzles and after cooling a spin finish is applied. The filament is then stretched between stretch spools at a variably adjustable temperature and with a variably adjustable stretch ratio. The operation of winding the filament on the spool is effected by way of a spooler involving variably adjustable rotation.

In regard to use of the additive according to the invention in films the inventors were able to show on the basis of tests that the use of the additive according to the invention entails at least the same or even improved anti-block performance (COF) as silica and other barium sulphates with at the same time improved optical film properties (gloss, haze, transmittance) and with processing properties which are improved at the same time.

In that respect Tables 1, 2 and 3 show a comparison of the COF value, gloss and haze in relation to silica-based additive and other barium sulphates in comparison with the additive according to the invention.

The invention is further described with reference to the following Examples.

In general barium sulphate can be produced by the reaction of a barium salt such as the reaction of the sulphide, chloride or nitrate with sulphuric acid or a salt thereof such as sodium sulphate in an aqueous solution. That reaction generally delivers barium sulphate which usually involves a primary particle size of 0.01 to 20 µm. The barium sulphate produced in that way is filtered off, washed with water, dried and de-agglomerated for various purposes of use. For the following Examples the barium sulphate is used in the form of a filter cake or a suspension, that is to say prior to drying and de-agglomeration.

The invention is further described with reference to the following Examples.

EXAMPLE 1

10 g of barium sulphate of a grain size of 0.6 µm is added to 1000 g of distilled water in an open glass vessel and the resulting suspension is heated to a temperature of 60° C. 0.75 g of a 20% aqueous phosphoric acid (about 110 mg of $P_2O_5$) is added dropwise within 90 mins; in a similar fashion 0.60 ml of an $Na_2SiO_3$ solution (450 g/l-about 135 mg of $SiO_2$) is added dropwise and the pH value is adjusted to below 7.5. The suspension is stirred for a further 60 mins before the subsequent addition of 3.00 ml of an $Al_2(SO_4)_3$ solution (150 g/l-about 135 mg of $Al_2O_3$) within 90 mins at a pH value of greater than 4.5. During maturing of the suspension over a period of 120 mins an organic coating agent is added and the solid is subsequently separated off by means of filtration and washed to a conductivity of <500 µS/cm. The filter cake is made into a suspension with demineralised water at a solids content of 15% by weight and spray-dried. The resulting barium sulphate according to the invention (about 10 g) is of a grain size of 0.7 µm and contains 9.8 g of $BaSO_4$, 70 mg of $P_2O_5$, 100 mg of $SiO_2$ and 130 mg of $Al_2O_3$.

EXAMPLE 2

The following served as starting materials:
$BaSO_4$ filter cake with 35% solids content and a $d_{50,3}$ of the volume distribution of $d_{50,3}$=0.4 µm (measured by means of a disc centrifuge 'CPS Disc Centrifuge, Model DC2400' from CPS, USA)
demineralised water with a conductivity of about 3 µS/cm
sulphuric acid 5%
$Na_2SiO_3$ solution with 384 g of $SiO_2$/l
$Al_2(SO_4)_3$ solution with 75 g of $Al_2O_3$/l
$NaAlO_2$ solution with 262 g of $Al_2O_3$/l 3434 g of $BaSO_4$ paste ($\hat{=}$ 1202 g of $BaSO_4$) were weighed out into a glass beaker and the solids content adjusted to 15% by the addition of demineralised $H_2O$. The suspension was heated to 55° C. and then adjusted to pH 7.5. 25 g of a 20% phosphoric acid ($H_3PO_4$) was added to the suspension dropwise within 60 mins, which corresponds to a proportion of 0.3% of $P_2O_5$ with respect to $BaSO_4$. In a similar fashion 15.7 mL of $Na_2SiO_3$ solution was added, which corresponds to a proportion of 0.5% of $SiO_2$ with respect to $BaSO_4$. In that case the pH value was so adjusted that the pH value does not exceed 7.5. Agitation was effected for a further 50 mins at 60° C. Then 26.2 mL of $NaAlO_2$ solution was added within 60 mins, which corresponds to a proportion of 0.57% of $Al_2O_3$ with respect to $BaSO_4$. The pH value was so regulated that it does not fall below pH 4.5. The suspension was then agitated for 70 mins at a temperature of 60° C. (maturing time). Thereafter the suspension was sucked off by way of a suction filter and washed to a conductivity of <200 µS/cm. The filter cake is made into a suspension with demineralised water at a solids content of 15% by weight and spray-dried.

EXAMPLE 3

The following served as starting materials:
$BaSO_4$ filter cake with 35% solids content and a $d_{50,3}$ of the volume distribution of $d_{50,3}$=0.4 µm (measured by means of a disc centrifuge 'CPS Disc Centrifuge, Model DC2400' from CPS, USA)
demineralised water with a conductivity of about 3 µS/cm
sulphuric acid 5%
$Na_2SiO_3$ solution with 384 g of $SiO_2$/l
$Al_2(SO_4)_3$ solution with 75 g of $Al_2O_3$/l
$NaAlO_2$ solution with 262 g of $Al_2O_3$/l
1,1,1-trimethylolpropane (TMP)

3440 g of $BaSO_4$ paste ($\hat{=}$ 1204 g of $BaSO_4$) were weighed out into a glass beaker and the solids content adjusted to 25% by the addition of demineralised $H_2O$. The suspension was heated to 55° C. and then adjusted to pH 7.25 g of a 20% phosphoric acid ($H_3PO_4$) was added to the suspension dropwise within 60 mins, which corresponds to a proportion of 0.3% of $P_2O_5$ with respect to $BaSO_4$. In a similar fashion 15.7 mL of $Na_2SiO_3$ solution was added, which corresponds to a proportion of 0.5% of $SiO_2$ with respect to $BaSO_4$. In that case the pH value was so adjusted that the pH value does not exceed 7.5. Agitation was effected for a further 60 mins at 60°

C. Then 26.2 mL of $NaAlO_2$ solution was added within 70 mins, which corresponds to a proportion of 0.57% of $Al_2O_3$ with respect to $BaSO_4$. The pH value was so regulated that it does not fall below pH 4.5. The suspension was then agitated for 70 mins at a temperature of 60° C. (maturing time). Thereafter the suspension was sucked off by way of a suction filter and washed to a conductivity of <200 μS/cm. The filter cake is made into a suspension with demineralised water at a solids content of 30% by weight, mixed with 0.3% by weight of TMP and spray-dried and air jet-crushed.

EXAMPLE 4

The following served as starting materials:
$BaSO_4$ filter cake with 50% solids content and a $d_{50,3}$ of the volume distribution of $d_{50,3}=1.1$ μm (measured by means of a disc centrifuge 'CPS Disc Centrifuge, Model DC2400' from CPS, USA)
demineralised water with a conductivity of about 3 μS/cm
sulphuric acid 5%
$Na_2SiO_3$ solution with 384 g of $SiO_2$/l
$Al_2(SO_4)_3$ solution with 75 g of $Al_2O_3$/l
$NaAlO_2$ solution with 262 g of $Al_2O_3$/l.

2420 g of $BaSO_4$ paste ($\hat{=}$ 1210 g of $BaSO_4$) were weighed out into a glass beaker and the solids content adjusted to 25% by the addition of demineralised $H_2O$. The suspension was heated to 55° C. and then adjusted to pH 7.25 g of a 20% phosphoric acid ($H_3PO_4$) was added to the suspension dropwise within 70 mins, which corresponds to a proportion of 0.3% of $P_2O_5$ with respect to $BaSO_4$. In a similar fashion 15.7 mL of $Na_2SiO_3$ solution was added, which corresponds to a proportion of 0.5% of $SiO_2$ with respect to $BaSO_4$. In that case the pH value was so adjusted that the pH value does not exceed 7.5. Agitation was effected for a further 40 mins at 60° C. Then 26.2 mL of $NaAlO_2$ solution was added within 60 mins, which corresponds to a proportion of 0.57% of $Al_2O_3$ with respect to $BaSO_4$. The pH value was so regulated that it does not fall below pH 4.5. The suspension was then agitated for 90 mins at a temperature of 60° C. (maturing time). Thereafter the suspension was sucked off by way of a suction filter and washed to a conductivity of <300 μS/cm. The filter cake was made into a suspension with demineralised water at a solids content of 20% by weight and spray-dried.

COMPARATIVE EXAMPLE 1

The following served as starting materials:
$BaSO_4$ filter cake with 35% solids content and a $d_{50,3}$ of the volume distribution of $d_{50,3}=0.4$ μm (measured by means of a disc centrifuge 'CPS Disc Centrifuge, Model DC2400' from CPS, USA)
demineralised water with a conductivity of about 3 μS/cm
sulphuric acid 5%
caustic soda solution 5%

3428 g of $BaSO_4$ paste (~1200 g of $BaSO_4$) was weighed out into a glass beaker and the corresponding amount of demineralised $H_2O$ added to set a solids content of 20%. The pH value of the suspension was 5.0. The ingredients were dispersed and the resulting suspension heated with agitation to 80° C. The suspension was adjusted to a pH value of 7.5 by the slow addition of 5% caustic soda solution over a period of 30 minutes. The suspension was then agitated for a further hour at a temperature of 70° C. (maturing time). Thereafter the suspension was sucked off by way of a suction filter and washed to a conductivity of <300 μS/cm. The filter cake was made into a suspension with demineralised water with a solids content of 15% by weight and spray-dried.

COMPARATIVE EXAMPLE 2

The following served as starting materials:
$BaSO_4$ filter cake with 50% solids content and a $d_{50,3}$ of the volume distribution of $d_{50,3}=1.1$ μm (measured by means of a disc centrifuge 'CPS Disc Centrifuge, Model DC2400' from CPS, USA)
demineralised water with a conductivity of about 3 μS/cm
sulphuric acid 5%
caustic soda solution 5%

2400 g of $BaSO_4$ paste (~1200 g of $BaSO_4$) was weighed out into a glass beaker and the corresponding amount of demineralised $H_2O$ added to set a solids content of 30%. The pH value of the suspension was 4.6. The ingredients were dispersed and the resulting suspension heated with agitation to 80° C. The suspension was adjusted to a pH value of 7.5 by the slow addition of 5% caustic soda solution over a period of 30 minutes. The suspension was then agitated for a further hour at a temperature of 70° C. (maturing time). Thereafter the suspension was sucked off by way of a suction filter and washed to a conductivity of <300 μS/cm. The filter cake was made into a suspension with demineralised water with a solids content of 20% by weight and spray-dried.

COMPARATIVE EXAMPLE 3

$BaSO_4$ filter cake with 50% solids content and a $d_{50,3}$ of the volume distribution of $d_{50,3}=1.1$ μm (measured by means of a disc centrifuge 'CPS Disc Centrifuge, Model DC2400' from CPS, USA)
demineralised water with a conductivity of about 3 μS/cm
caustic soda solution 5%
hydrochloric acid 5%
$Na_2SiO_3$ solution with 384 g of $SiO_2$/l
$NaAlO_2$ solution with 262 g of $Al_2O_3$/l
BaS solution with 50-55 g of BaS/l 1800 g of $BaSO_4$ paste was weighed out into a glass beaker and made into a suspension with demineralised $H_2O$ of 3300 g. The suspension was heated to 70° C. and then adjusted with caustic soda solution to pH 7.5. A barium excess of about 5 g of $Ba^{2+}$/l was then adjusted with 350 mL of BaS solution (~50-55 g of BaS/L). The pH value was adjusted again to pH 7 with hydrochloric acid, then $Na_2SiO_3$ solution (0.2% $SiO_2$ with respect to $BaSO_4$) was added. The pH value was adjusted to pH 4.0 with hydrochloric acid and the suspension was matured for 30 mins. The pH value was adjusted to pH 6.0 with caustic soda solution and, with the pH being maintained, $NaAlO_2$ solution was added (0.1% of $Al_2O_3$ with respect to $BaSO_4$). Thereafter the pH value was adjusted to pH 7.0 followed by 30 mins maturing. Thereafter the suspension was sucked away by way of a suction funnel and washed to a conductivity of <300 μS/cm. The filter cake was made into a suspension with demineralised water with a solids content of 20% by weight and spray-dried.

COMPARATIVE EXAMPLE 4

$BaSO_4$ filter cake with 35% solids content and a $d_{50,3}$ of the volume distribution of $d_{50,3}=0.4$ μm (measured by means of a disc centrifuge 'CPS Disc Centrifuge, Model DC2400' from CPS, USA)
demineralised water with a conductivity of about 3 μS/cm
caustic soda solution 5%
hydrochloric acid 5%

Na$_2$SiO$_3$ solution with 384 g of SiO$_2$/l
NaAlO$_2$ solution with 262 g of Al$_2$O$_3$/l
BaS solution with 50-55 g of BaS/l 2500 g of BaSO$_4$ paste was weighed out into a glass beaker and made into a suspension with demineralised H$_2$O of 3300 g. The suspension was heated to 70° C. and then adjusted with caustic soda solution to pH 7. A barium excess of about 5 g of Ba$^{2+}$/l was then adjusted with 350 mL of BaS solution. The pH value was adjusted again to pH 7 with hydrochloric acid, then Na$_2$SiO$_3$ solution (0.1% SiO$_2$ with respect to BaSO$_4$) was added. The pH value was adjusted to pH 4.0 with hydrochloric acid and the suspension was matured for 30 mins. The pH value was adjusted to pH 6.0 with caustic soda solution and, with the pH being maintained, NaAlO$_2$ solution was added (0.2% of Al$_2$O$_3$ with respect to BaSO$_4$). Thereafter the pH value was adjusted to pH 7.0 followed by 30 mins maturing. Thereafter the suspension was sucked away by way of a suction funnel and washed to a conductivity of <300 µS/cm. The filter cake was made into a suspension with demineralised water with a solids content of 15% by weight and spray-dried.

COMPARATIVE EXAMPLE 5

(IN ACCORDANCE WITH DE 44 31 735)

The following served as starting materials:
BaSO$_4$ filter cake with 35% solids content and a d$_{50,3}$ of the volume distribution of d$_{50,3}$=0.4 µm (measured by means of a disc centrifuge 'CPS Disc Centrifuge, Model DC2400' from CPS, USA)
demineralised water with a conductivity of about 3 µS/cm
sulphuric acid 5%
Na$_2$SiO$_3$ solution with 384 g of SiO$_2$/l
Al$_2$(SO$_4$)$_3$ solution with 75 g of Al$_2$O$_3$/l
NaAlO$_2$ solution with 262 g of Al$_2$O$_3$/l Production of Comparative Example 4 was implemented in a glass beaker. 3440 g of BaSO$_4$ paste ($\hat{=}$ 1204 g of BaSO$_4$) was weighed out into the beaker and the corresponding amount of demineralised H$_2$O added to adjust a solids content of 30%. The suspension was heated to 70° C. and then adjusted to pH 7. 25 g of a 20% phosphoric acid (H$_3$PO$_4$) was added to the suspension within 10 mins, which corresponds to a proportion of 0.3% of P$_2$O$_5$ with respect to BaSO$_4$. Thereafter 15.7 mL of Na$_2$SiO$_3$ solution was added within 10 mins, corresponding to a proportion of 0.5% of SiO$_2$ with respect to BaSO$_4$. In that situation the pH value was so adjusted that the pH value does not exceed 7.5. Agitation was effected for a further 15 mins at 70° C. 26.2 mL of NaAlO$_2$ solution was then added within 10 mins, which corresponds to a proportion of 0.57% of Al$_2$O$_3$ with respect to BaSO$_4$. The pH value was so regulated that it does not fall below pH 4.5. The suspension was then agitated for 2 further hours at a temperature of 70° C. (maturing time). Thereafter the suspension was sucked off by way of a suction filter and washed to a conductivity of <500 µS/cm. The filter cake was made into a suspension with demineralised water with a solids content of 15% by weight and spray-dried.

I. Incorporation of the Barium Sulphate Samples Produced in the Comparative Examples and the Examples into a Polymer by Way of the Polycondensation Process PET films were produced as follows, based on the barium sulphate samples of Comparative Examples 1-5 and Examples 1-4.

800 g of the respective barium sulphate is intensively dispersed in 800 g of monoethyleneglycol (MEG) by crushing in an agitator ball mill. The suspensions obtained are diluted with further MEG to a solids content of 20% by weight.

Production of the polyester granules with a low degree of barium sulphate filling was carried out as described hereinafter in known manner. 10.16 kg of polyester precondensate (BHET from Aldrich) and 1 l of MEG were respectively placed in a batch reactor and melted. After about 1 hour a paste comprising 25 kg of terephthalic acid and 10 l of MEG respectively was fed into the container. Esterification was effected in known manner over a period of about 160 minutes, in which case the temperature of the reaction mixture reached about 280° C. The end point of the esterification reaction was defined by the end of dehydration. That was then followed by the addition of 0.77 kg of the 20% barium sulphate-MEG suspension respectively to the reaction mixture. The system was kept under agitation for a further 20 minutes at 250 to 270° C. for complete thorough mixing, mixed with 1084.7 ml of a 1.29% Sb$_2$O$_3$-MEG suspension as a polycondensation catalyst, agitated for a further 10 minutes and then transferred into the polycondensation reactor.

Subsequent implementation of polycondensation was effected in known manner with a reduction in pressure to 2 mbar end pressure, and a temperature for the reaction mixture of 285 to 290° C. over a time of 111 minutes. The increase in torque at the agitator was tracked as the criterion for the end of the reaction. The molten material was then expelled from the reactor by an increased nitrogen pressure, followed by cooling and granulation of the polymer extrudate. The resulting granules contained 0.2% of the barium sulphate (determined by ascertaining the ashing residue).

II. Incorporation of the Barium Sulphate Samples Produced in the Comparative Examples and the Examples into a Polymer by Way of the Extrusion Process PET films were produced as follows, based on the barium sulphate samples of Comparative Examples 1-5 and Examples 1-4.

Crushed PET polymer is dried in a vacuum drying cabinet at 80° C. for 16 hours. Thereafter a mixture of 5% of barium sulphate and 95% of that dried PET polymer, with a total amount of 3000 g, is produced. That mixture is extruded by way of a double-screw extruder with a screw functional length of 110.5 cm and of a diameter of 34 mm at a temperature of 260-270° C. The masterbatch produced is crystallised in the vacuum drying cabinet for 12-16 h at 150° C. By means of further dilution with dried PET polymer, the desired barium sulphate concentration is produced in a single-screw extruder. In that step the films are produced immediately by extrusion through a flat-film attachment.

III. Examples of Use

The materials of Comparative Examples 1-5 and Examples 1-4 as well as a silica-based additive are firstly extruded in the same fashion to give a 5% PET masterbatch in order firstly to produce therefrom about 100 µm-thick PET cast films by way of a flat-film attachment on the extruder, which in turn are subsequently stretched biaxially to give approximately 10 µm-thick BOPET films. For that purpose cut-out portions, measuring 10×10 cm, of the extruded flat film are stretched at a temperature of 100° C. at a constant stretching speed and a stretch rate of 3×3.

The BOPET films produced are investigated in respect of COF, gloss and haze. The results of the investigations are set out in Tables 1 to 3.

It can be seen from the list of the COF values (see Table 1) that the films with the additives according to the invention are at a comparable COF level—tending to be lower—than the films with the Comparative Examples and silica.

Marked differences are to be found in relation to gloss (see Table 2). The films with materials of the Examples according to the invention are at a markedly higher level than silica-bearing films. The barium sulphates of Comparative Examples 1 and 2, which were not post-treated, also lead to a marked reduction in gloss in the films. In films, the materials according to the invention exhibit a very low degree of haze (see Table 3) which is markedly lower than in the case of the films with materials of the Comparative Examples and silica. In particular the air jet-crushed material of Example 3 shows a very low degree of haze. The extrusion masterbatch with the additive according to the invention of Example 1 is also distinguished by a comparatively significantly lower pressure filter test (see FIG. 1). The AB additive used in that case was produced in accordance with Example 1.

On the basis of the results shown in Tables 1 to 3 it is apparent that the additives produced according to the invention at the same time have a highly favourable effect on the desirable properties of the polymer.

TABLE 1

COF - A/B kinetic (in accordance with DIN EN ISO 8295)

| Additive | 0 ppm | 500 ppm | 1000 ppm | 1500 ppm | 2000 ppm |
|---|---|---|---|---|---|
| Silica-based additive | 0.40 | 0.36 | 0.35 | 0.30 | 0.36 |
| Comparative Example 1 | 0.40 | 0.39 | 0.35 | 0.30 | 0.32 |
| Comparative Example 2 | 0.40 | 0.35 | 0.34 | 0.34 | 0.34 |
| Comparative Example 3 | 0.40 | 0.36 | 0.35 | 0.35 | 0.35 |
| Comparative Example 4 | 0.40 | 0.39 | 0.35 | 0.33 | 0.34 |
| Comparative Example 5 | 0.40 | 0.40 | 0.37 | 0.36 | 0.37 |
| Example 1 | 0.40 | 0.40 | 0.29 | 0.29 | 0.33 |
| Example 2 | 0.40 | 0.38 | 0.29 | 0.28 | 0.29 |
| Example 3 | 0.40 | 0.36 | 0.27 | 0.27 | 0.28 |
| Example 4 | 0.40 | 0.33 | 0.33 | 0.32 | 0.32 |

TABLE 2

Gloss 45° in % (in accordance with ASTM 2457)

| Additive | 0 ppm | 500 ppm | 1000 ppm | 1500 ppm | 2000 ppm |
|---|---|---|---|---|---|
| Silica-based additive | 129 | 108 | 106 | 86 | 76 |
| Comparative Example 1 | 129 | 105 | 101 | 89 | 75 |
| Comparative Example 2 | 129 | 107 | 100 | 87 | 72 |
| Comparative Example 3 | 119 | 118 | 111 | 107 | 101 |
| Comparative Example 4 | 129 | 116 | 109 | 107 | 102 |
| Comparative Example 5 | 129 | 116 | 110 | 110 | 103 |
| Example 1 | 129 | 124 | 121 | 118 | 114 |
| Example 2 | 129 | 126 | 124 | 121 | 118 |
| Example 3 | 129 | 128 | 125 | 123 | 119 |
| Example 4 | 129 | 125 | 121 | 115 | 115 |

TABLE 3

Haze in % (in accordance with ASTM 1003)

| Additive | 0 ppm | 500 ppm | 1000 ppm | 1500 ppm | 2000 ppm |
|---|---|---|---|---|---|
| Silica-based additive | 1.0 | 5.0 | 6.0 | 14.0 | 24.0 |
| Comparative Example 1 | 1.0 | 7.0 | 12.5 | 21.0 | 34.0 |
| Comparative Example 2 | 1.0 | 9.5 | 16.5 | 26.0 | 38.0 |
| Comparative Example 3 | 1.0 | 2.5 | 5.0 | 5.5 | 6.5 |
| Comparative Example 4 | 1.0 | 3.0 | 3.5 | 4.5 | 6.0 |
| Comparative Example 5 | 1.0 | 3.0 | 6.5 | 8.0 | 10.5 |
| Example 1 | 1.0 | 2.5 | 2.5 | 3.0 | 3.5 |
| Example 2 | 1.0 | 1.5 | 2.0 | 2.5 | 3.0 |
| Example 3 | 1.0 | 1.0 | 1.0 | 1.5 | 2.0 |
| Example 4 | 1.0 | 2.0 | 2.5 | 3.0 | 4.0 |

The invention claimed is:

1. A process for the production of an additive for polymers, comprising:
   a. phosphoric acid $H_3PO_4$ or a water-soluble phosphate compound is added in an amount of 0.1 to 10% by weight, calculated as $P_2O_5$ and with respect to dry $BaSO_4$, to an agitated aqueous suspension containing 0.5 to 50% by weight of $BaSO_4$;
   b. $Na_2SiO_3$ is added in an amount of 0.1 to 15% by weight, calculated as $SiO_2$ and with respect to dry $BaSO_4$, to the agitated suspension in accordance with process step (a), wherein the pH value of the suspension is kept below 7.5;
   c. a water-soluble aluminium compound is added in an amount of 0.1 to 20% by weight, calculated as $Al_2O_3$ and with respect to $BaSO_4$, to the agitated suspension in accordance with process step (b), wherein the pH value of the suspension is not kept below 4.5; and
   d. the suspended solid is separated from the aqueous phase of the suspension in accordance with process step (c) and dried;
   wherein the process steps (a), (b), and (c) are each respectively carried out over a period of 30 to 90 minutes in a temperature range of below 65° C.

2. A process according to claim 1, wherein process steps (a), (b) and (c) are carried out in the temperature range of 55° C. to below 65° C.

3. A process according to claim 1, wherein the process steps (a), (b), and (c) are respectively carried out over a period of 50 to 70 minutes.

4. A process according to claim 1, wherein the product of process step (c) is subjected to a further process step of coating with an organic coating agent, wherein the organic coating agent is selected from the group consisting of crosslinking agents, dispersing agents, deflocculation agents, and mixtures thereof.

5. A process according to claim 4 wherein the process step of coating with an organic coating agent is carried out over a period of 5 to 60 minutes at a temperature of 40° C. to 80° C.

6. A process according to claim 4 wherein the organic coating agent is selected from the group consisting of alkali metal salts of organic acids, inorganic or organic polyphosphates, poly(meth)acrylates, polyethers, anionically modified polyethers, fatty alcohol polyglycol ethers, polyhydric alcohols, modified polyurethanes, anion-active aliphatic esters, and mixtures thereof.

7. A process according to claim 6, wherein the alkali metal salts of organic acids comprise a salt of poly(meth)acrylic acid, acetic acid, or citric acid.

8. A process according to claim 4, wherein the organic coating agent comprises alkali metal, alkaline earth, or zinc salts of acetic acid and/or citric acid.

9. A process according to claim 4, wherein the organic coating agent comprises alkali metal or alkaline earth metal salts of acrylate or methacrylate copolymers.

10. A process according to claim 6, wherein the polyphosphates comprise potassium polyphosphate or poly(meth)acrylate phosphates.

11. A process according to claim 1, wherein the product of process step d) is subjected to a grinding step.

12. A process according to claim 11, wherein said grinding step is in an impact or fluid-energy jet mill to obtain a grain size of below 10 μm.

13. A process according to claim 1, wherein the product of process step d) is subjected to a sifting operation, wherein a grain size of below 10 μm is obtained.

14. An additive for polymers which is obtained according to the process of claim 1.

15. A polymer comprising an additive according to claim 14.

16. A polymer according to claim 15, wherein the additive is present in a range of 200 to 10,000 ppm with respect to a finished product.

17. A film comprising a polymer according to claim 15.

18. A polymer fiber comprising an additive according to claim 14.

19. A coating agent comprising an additive according to claim 14.

20. A coating agent according to claim 19, wherein said coating agent comprises a Printed Circuit Board ink.

* * * * *